May 20, 1969 G. D. RAYNO ET AL 3,444,602
ELECTRICAL CAPACITOR AND METHOD OF MAKING THE SAME
Original Filed April 29, 1964 Sheet _1_ of 2

INVENTORS:
GLENN D. RAYNO
FREDERICK W. GRAHAME,
CARL E. PAUL, DECEASED,
ANNE F. PAUL, EXECUTRIX

BY *James J. Lichiello*

THEIR ATTORNEY.

INVENTORS:
GLENN D. RAYNO
FREDERICK W. GRAHAME
CARL E. PAUL, DECEASED
ANNE F. PAUL, EXECUTRIX

BY

THEIR ATTORNEY.

United States Patent Office 3,444,602
Patented May 20, 1969

3,444,602
ELECTRICAL CAPACITOR AND METHOD OF MAKING THE SAME
Glenn D. Rayno and Frederick W. Grahame, Glens Falls, N.Y., and Carl E. Paul, deceased, late of Glens Falls, N.Y., by Anne F. Paul, executrix, Glens Falls, N.Y., assignors to General Electric Company, a corporation of New York
Original application Apr. 29, 1964, Ser. No. 363,427, now Patent No. 3,299,333, dated Jan. 24, 1967. Divided and this application Nov. 7, 1966, Ser. No. 592,573
Int. Cl. H01g 13/00
U.S. Cl. 29—25.42    7 Claims

ABSTRACT OF THE DISCLOSURE

A capacitor casing of a predetermined size has a smaller capacitor section therein, and planar sectional parts of opposite side walls of the casing are suitably indented to engage and position the capacitor section in the casing.

---

The present invention relates to electrical capacitors, and more particularly to encased electrical capacitors having a novel configuration, and a method of producing the same which imparts improved electrical and mechanical characteristics to the capacitor.

This application is a division of copending application Ser. No. 363,427 filed Apr. 29, 1964, now U.S. Patent 3,299,333 and assigned to the same assignee as the present invention.

In the manufacture of electrical capacitors of wound, dielectric liquid-impregnated type, it is common practice to place the wound capacitor roll in a metal casing, and seal the casing after filling it with the dielectric liquid impregnant. To easily accommodate the wound roll and facilitate the assembly procedure, the casing is normally somewhat larger in cross section that the wound capacitor section. In some types of capacitors, as for example fluorescent lamp ballast capacitors, the wound roll is flattened somewhat and placed in a generally oval shaped casing.

Conventionally encased capacitors of this type are subject to certain disadvantages. For one thing casing sizes have to be varied in accordance with the sizes of the contained capacitor rolls. This requires the maintenance of a large stock of different casing sizes to accommodate capacitor rolls for different capacitor ratings. Another problem is the fact that the conventionally encased units were often subject to internal arcing and corona effects when operated under low temperature conditions. The reason for this appears to be that when the capacitor is subjected to low temperature, contraction of the dielectric liquid in the casing resulted in draining of the dielectric liquid from the upper terminal region within the casing into the capacitor roll and reduced dielectric protection was thereby afforded in the region where corona is most likely to occur.

It is an object of the invention to provide an encased electrical capacitor which avoids the above described and other disadvantages of the prior types of capacitors.

It is a particular object of the invention to provide encased electrical capacitors having more efficient utilization of materials and space, having more rigid mechanical construction, which permit better standardization of case sizes, which facilitate assembly procedures, and which have good electrical properties over a wide range of temperature and particularly at low temperature.

It is still another object of the invention to provide a novel method of making encased capacitors of the above type which is simple and economical to use and is adapted for application to conventionally encased capacitors and in conjunction with established manufacturing procedures and equipment.

Other objects and advantages will become apparent from the following description and the appended claims.

With the above objects in view, the present invention relates to an electrical capacitor which comprises a sealed metal casing having opposite sidewall portions and containing a wound capacitor section therein, the opposite casing sidewall portions being in contact with a major portion of the surface of the capacitor section and constantly holding the latter in compression.

In a preferred method employed in accordance with the invention, a metal capacitor casing having opposite sidewalls and containing a rolled capacitor section is subjected to a pressing operation whereby the opposite casing sidewalls are pressed inwardly so that they contact the capacitor section over a substantial portion of its surface and hold it in continual compression.

The invention will be better understood from the following description taken in conjunction with the accompanying drawings in which.

Figure 1:
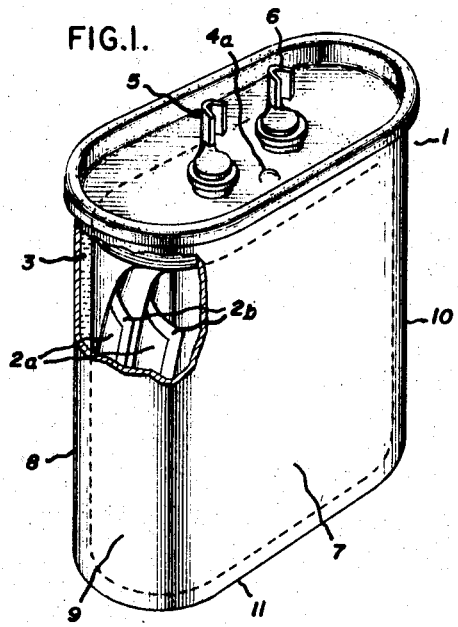
FIG. 1 is a perspective view partly broken away of a capacitor unit prior to being reshaped in accordance with the invention.

Referring now to the drawings, and particularly to FIG. 1, there is shown a capacitor which is typical of those employed with fluorescent lamp ballast apparatus and comprising a sealed metal casing 1 of generally oval configuration containing a wound capacitor roll section 2 which is made in conventional manner of wound electrode foil strips 2a separated by dielectric sheets 2b. The casing also contains dielectric liquid 3, composed of any suitable dielectric material such as chlorinated diphenyl, mineral oil or the like, which impregnates the capacitor roll section. Casing 1 is fluid-tightly sealed with an end wall or cover 4 on which are mounted electrode terminals 5, 6 which pass through bushing insulators in cover 4 and are respectively electrically connected at their lower ends by means of tap straps to the electrode foils of capacitor section 2, in accordance with well known capacitor construction. Casing 1 is normally somewhat larger than capacitor roll 2 in its compactly wound condition so as to enable ready insertion of roll 2 (which is often somewhat flattened to a shape roughly corresponding to the casing) into the casing during assembly procedures. A difficulty encountered in such construction is that when the unit is subjected to low temperature conditions, the dielectric liquid contracts and tends to cause the formation of low pressure conditions in the interior of the casing. Such low pressure conditions are conducive to electrical arcing and corona in the interior of the casing in the presence of electrical stress, resulting in premature breakdown and unduly shortened life of the capacitor. A difficulty encountered by the use of such capacitor casings in the conventional manner is the occurrence of internal arcing at low temperatures occasioned apparently by dropping of the dielectric liquid level in the casing due to its contraction at low temperature, so that the dielectric liquid no longer occupies the space between the terminals, or between the case and terminals, and electrical breakdown between these portions of different potential more readily occurs.

Figure 3:
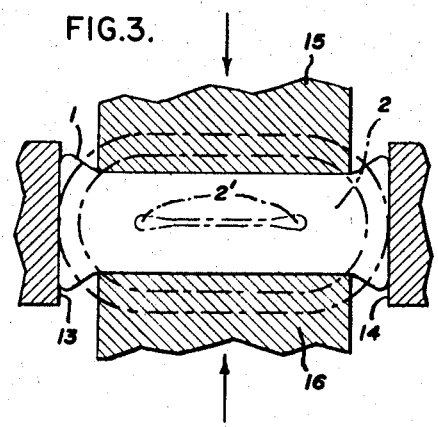
FIG. 3 illustrates somewhat diagrammatically a process and apparatus which may be employed in practicing the present invention and showing the change in the shape of the capacitor casing thereby produced.
Figure 4:
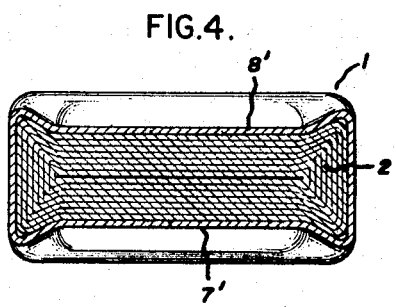
FIG. 4 is a cross sectional view of the FIG. 2 capacitor taken along the line 4—4.
Figure 5:
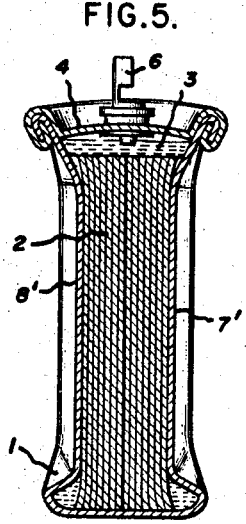
FIG. 5 is a cross sectional view of the FIG. 2 capacitor taken along the line 5—5.

These and other problems resulting from the use of the conventional units are overcome in a simple yet extremely effective manner in accordance with the invention by pressing, flattening, or otherwise deforming the opposite sidewalls of casing 1, in the manner shown in FIG. 3, to produce a casing with inwardly pressed opposite sidewalls holding capacitor roll 2 in continual compression, as shown more clearly in FIGS. 4 and 5.

Figure 2:
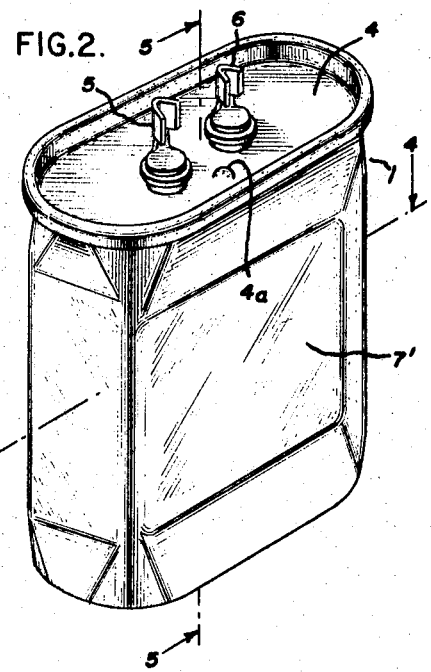
FIG. 2 is a similar view of the FIG. 1 capacitor after being reshaped in accordance with the invention.

FIG. 3 illustrates a preferred process for compressing the capacitor casing in accordance with the invention. As shown, metal casing 2 before being deformed has the general oval configuration shown by interrupted lines, and within the uncompressed casing 1 is contained capacitor roll section 2 also shown by interrupted lines interiorly of the casing outline. In the uncompressed form, capacitor roll 2 normally has an arbor slot having openings 2′ shown in interrupted lines. Casing 1 may be defined as having opposed planar sidewalls 7 and 8, with interconnecting arcuate edge wall portions 9 and 10, and a bottom end wall 11. Cover means 4 covers an open end 12, not shown, of the casing 1. In carrying out the process, the oval capacitor casing 1 is placed between fixed supporting surfaces 13 and 14 with its edge walls 9 and 10 in contact therewith. As thus supported, pressure-platens 15 and 16 having end faces of the dimensions and shape corresponding to the panel depressions 7′ and 8′ (see FIG. 2 and FIG. 5) to be formed in the casing sidewalls 7 and 8 are applied to the latter with the desired degree of pressure. The perimeter or periphery of the panels 7′ and 8′ as well as those of platens 15, 16 are spaced within the perimeter or periphery of the side elevation surface of the casing 1. Sufficient pressure is employed in the process to flatten or depress the side panels and bring them into contact with the contained capacitor roll section 2 and to provide the degree of capacitance desired for the unit by compressing the roll section 2. At the same time, supporting or restraining surfaces 13 and 14 prevent outward extension of edge walls 9 and 10 so that these end walls become generally flattened, as illustrated in FIGS. 3 and 4, and the overall width of the casing 1 remains generally unchanged. As a result of such pressure, the capacitor roll section 2 and casing sidewalls assume the respective shapes shown more clearly in FIG. 4. As will be seen, the depressed side panels 7 and 8 are in contact with and compress nearly the entire surface of the opposite sides of roll section 2, and the curved portions of roll section 2 extend into and occupy the casing end wall chambers.

The step of compressing the casing sidewalls may be carried out at different stages of the capacitor manufacturing process. In a preferred procedure, the capacitor roll 2 is inserted in oval (uncompressed) casing 1 with its tap straps respectively connected to the ends of terminals 5, 6 on the underside of cover 4, and the casing is closed by cover 4 which has a fill hole 4a therein, the fill hole at this stage not yet being sealed. The thus assembled unit is then subjected to the case-flattening process above described. Thereafter, the capacitor is impregnated with dielectric liquid introduced into the casing through fill hole 4a, and fill hole 4a is then sealed with solder.

In alternative procedures, the case-flattening process may be applied after the dielectric liquid is introduced into the casing through the cover fill hole, and either before or after fill hole 4a is sealed. In the situation where the case is compressed after the fill hole 4a is sealed, the gas space normally left in the casing above the level of the dielectric liquid provides ample room for receiving the dielectric liquid displaced as a result of the compression step.

In a typical instance, an oval shaped aluminum alloy case with a major internal axis of approximately 2 inches and a minor internal axis (before empaneling) of approximately 1.2 inches is used. Into the unflattened case is placed a wound and loosely flattened oval capacitor roll with a major axis of approximately 1.8 inches and a minor axis of approximately 0.60 to 0.90 inch. After the bushing and cover assembly has been attached, the aluminum case has panels depressed into the opposite sidewalls using a pressure of about 1300 to 1600 pounds per square inch. After empaneling, the distance between the panel is approximately 0.50 to 0.80 inch.

The panel forming technique is also applicable to other capacitor case materials such as zinc, zinc alloys, copper, copper alloys, and ferrous alloys. By suitable control of temperatures during the forming operation, it is also possible to apply the principle of empaneling to plastic cases.

As will be seen from FIG. 5, capacitor roll section 2 is preferably of sufficient height to extend above the flattened regions of casing walls 7 and 8. Also, sufficient dielectric liquid 3 is present in casing 1 to ensure that the dielectric liquid covers the top of roll section 2 and preferably fills the interior of the casing above roll section 2. A significant feature of the invention is that the uppermost portion of casing 1 is not subjected to the pressing operation, so that the spacing between the casing walls in that region is not substantially less than it was prior to the pressing operation or is substantially greater than the spacing of the walls in the compressed region. All of the foregoing features contribute to avoiding the occurrence of corona and arcing in the upper casing portion (internal terminal region), especially at low temperatures. Because the upper end of the roll is above the compressed portions of the case, there is more spacing provided between the electrode foil edges and the casing walls, and thus less chance is afforded for the development of corona between these portions.

While the illustrated embodiment is shown with the lower edge of the depressed sidewall portions above the bottom of casing 1, the invention includes within its scope a configuration wherein the bottom portion of casing 1 is also compressed so that the flattened capacitor assumes roughly a T shape in contrast to the dogbone shape shown in FIG. 5.

Flattening or depressing capacitor casing 1 in accordance with the invention provides a number of advantages in addition to those mentioned. The pressing operation by further flattening the contained capacitor roll substantially closes the openings in the arbor slot in the center of the roll (as will be seen from FIG. 4), reduces the spacing between the foil and dielectric layers, and reduces the area in the capacitor roll having a high air film content. There is thus achieved a greater capacitance per unit volume of the capacitors.

Moreover, with the casing walls flattened against and tightly compressing the capacitor roll, the dielectric liquid in the upper casing chamber is prevented from draining down into the roll during low temperature conditions and thus remains in the region of the terminals to avoid corona effects there.

An advantage which follows from the invention is that since the width of the casing may initially be appreciably larger than the capacitor roll, capacitor rolls of various sizes (and hence of various capacitances) may be incorporated in cases of the same size, thus making possible manufacturing economies.

The intimate contact between the casing sidewalls and a large area of the capacitor roll also provides improved dissipation of heat generated in the capacitor during operation and thereby enhances the operating and life characteristics of the capacitor.

Experience has shown that the higher the internal pressure of the capacitors at low temperature, the less likely is the occurrence of corona. On this basis, tests were conducted to compare the internal pressures of flattened as against non-flattened capacitors of the same construction with variations of temperature.

Figure 6:
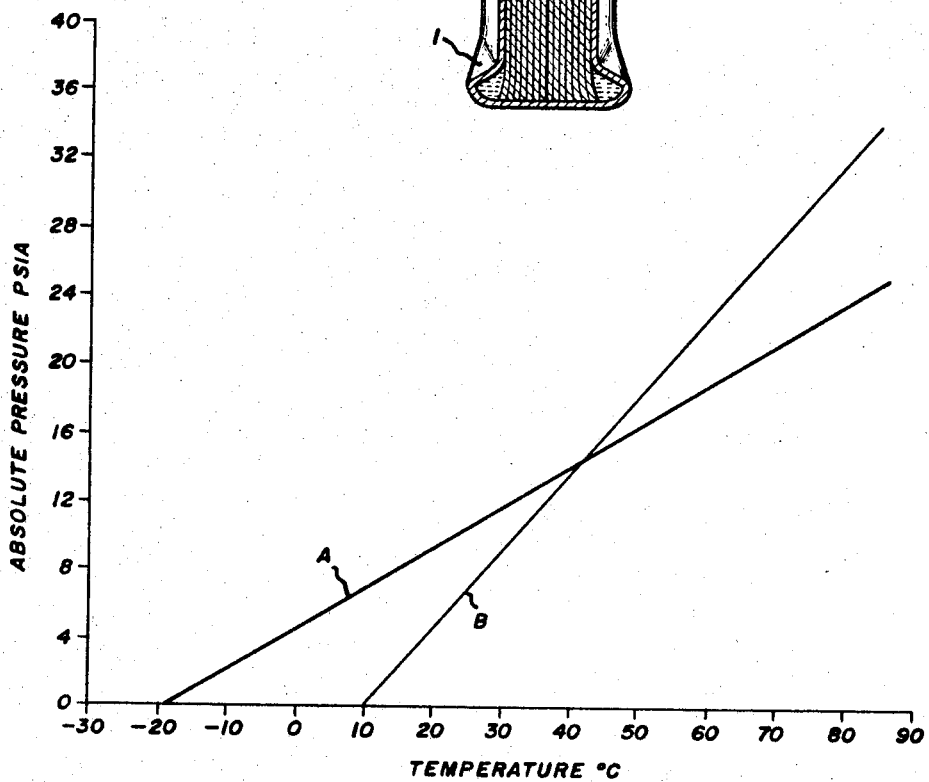
FIG. 6 is a graphical showing of the improved properties of a capacitor formed in accordance with the present invention.

FIG. 6 illustrates graphically the results of such a test. In the graph, the absolute pressure in pounds per square inch is plotted against temperature in degrees centigrade. Curve A represents capacitors having a flattened form in accordance with the invention, and curve B represents a standard oval-shaped capacitor. In the test, the capacitors were sealed at 40° C. under atmospheric pressure and were then heated to 85° C. for one hour and then cooled to −30° C. during an 8-hour period.

As will be seen from the graph, internal pressure in the units varied linearly with change in temperature, but the pressure in the standard unit varied twice as rapidly as that in the flattened units, showing that the latter are more desirable because they maintain a more constant pressure between high and low temperatures extremes. Of particular significance is the considerably greater pressure in the flattened units at low temperatures. As shown by the graph, a temperature drop of 60° C. from the sealing temperature is required for the flattened units to reach 0 pressure, whereas the standard units reach 0 pressure after a drop of only 30° C. It is thus evident that the flattened units provide internal conditions much superior to the non-flattened capacitors in terms of avoiding corona and arcing effects, especially at low temperatures.

Life tests conducted in connection with the invention have shown that capacitor units flattened in accordance with the invention will have as much as four or more times as long life as the average life of similar capacitors which have not been reshaped as herein described. Additional tests have indicated that the minimum low-temperature breakdown potential from terminals to case of the flattende units is at least twice as high as conventional capacitors of unflattened form.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed as new and desired to be secured by Letters Patent of United States is:

1. In a method of assembling an electrical capacitor within a metal casing having a cover end wall including electrical connectors thereon, and where the capacitor is substantially spaced within said casing, the step of
   (a) deforming opposite large substantially flat planar portions of said casing toward each other to fixedly position said capacitor therebetween under continuous compression over a large area thereof and to reduce the volume of said casing, said deformation characterized by
      (1) being spaced from said cover of said casing substantially more than from an opposite end and
      (2) defining a free volume adjacent said cover of said casing to contain a quantity of liquid dielectric therein.

2. A method of making an electrical capacitor which comprises
   (a) inserting a capacitor section in a metal casing of generally oval shape having top and bottom end walls and opposite sidewalls;
   (b) forming inwardly depressed planar portions in said opposite sidewalls intermediate the top and bottom end walls of said casing with sufficient pressure to bring said depressed portions into continual compressive contact with the surfaces of the contained capacitor section while preserving one of said end walls from any substantial size reduction;
   (c) introducing dielectric liquid into the thus treated casing through an opening in one of said end walls;
   (d) and sealing said opening.

3. A method of assembling an electrical capacitor comprising
   (a) utilizing a generally rectangular metal casing characterized by
      (1) having opposed sidewalls with interconnecting edge wall portions, a bottom end wall, and an open upper end;
   (b) inserting a convolute capacitor section in said casing;
   (c) sealing a cover having electrode means extending therethrough for electrical contacts with said capacitor section on said open end;
   (d) positioning said casing with said sidewalls between opposed concentric press platens;
   (e) said platens each having a face surface whose periphery is spaced within the periphery of said sidewalls upon engagement thereof and closer to said bottom end wall than to said upper end;
   (f) restraining said edge wall portions from outward motion;
   (g) causing relative motion of said platens toward each other to provide opposite panel indentations in said sidewalls characterized by
      (1) compressing said capacitor section therebetween,
      (2) substantially reducing the volume of said casing,
      (3) retaining said capacitor section under continuous compression,
      (4) defining an open volume between said casing and capacitor section adapted to contain a liquid dielectric;
   (h) introducing a liquid dielectric into said casing through an aperture therein;
   (i) and sealing said aperture.

4. A method of assembling a capacitor comprising
   (a) employing a casing having a pair of parallel sidewalls interconnected by arcuate edge walls and a bottom end wall surface to define an enclosed volume with an open upper end;
   (b) inserting a convolute capacitor section in said casing;
   (c) placing and sealing an end cover having electrode terminals thereon connected to said capacitor section on the said open end of said casing;
   (d) simultaneously compressing planar portions of said sidewalls toward each other to fixedly position said capacitor therebetween in continuous compressed relationship and reducing the volume of said casing;
   (e) said planar portions having peripheries spaced within the periphery of said sidewalls;
   (f) simultaneously restraining the said edge walls from outward lateral expansion caused by compression of said sidewalls, by a planar wall so that said edge walls become flattened and the overall width of said casing is essentially unchanged;
   (g) localizing said compression and restraining to provide a casing having a large open volume next adjacent said electrodes whereat the sidewalls thereof do not engage said capacitor section, said volume adapted to contain a liquid dielectric;
   (h) introducing a dielectric liquid into said casing through an aperture therein to impregnate said capacitor section;
   (i) and sealing said aperture.

5. The invention as recited in claim 4 wherein said casing is evacuated and a dielectric liquid is introduced therein prior to said compression.

6. The invention as recited in claim 4 wherein said dielectric liquid is introduced after said compressing.

7. A method of assembling a smaller capacitor section in a significantly larger capacitor metal casing having opposed transerve closed end metal walls of a predetermined size and configuration through one of which an electrical connection passes to the capacitor section, comprising
   (a) inserting said capacitor section in said casing,
   (b) permanently deforming said casing and fixedly positioning the capacitor section under continuous compression by essentially compressing opposed general planar panels therein at a position between and spaced from said transverse closed end walls without substantially changing the size and configuration of said closed end walls,
(c) said planar panels being depressed in said casing and extending over a substantial portion of the casing and said capacitor section therein to position and retain said capacitor section therebetween,
(d) said depressed panels in combination with said larger casing and smaller capacitor section providing open volume areas between said casing and said capacitor section which are adjacent each transverse end wall.

References Cited

UNITED STATES PATENTS

| 1,627,493 | 5/1927 | Dubilier | 29—25.42 XR |
| 1,757,692 | 5/1930 | Vawter | 29—25.42 XR |
| 2,028,564 | 1/1936 | Robinson et al. | 317—260 |
| 2,029,430 | 2/1936 | Kopinski | 317—260 |

JOHN F. CAMPBELL, *Primary Examiner.*

R. B. LAZARUS, *Assistant Examiner.*

U.S. Cl. X.R.

317—260